United States Patent [19]

Ogawa et al.

[11] Patent Number: 4,984,842
[45] Date of Patent: Jan. 15, 1991

[54] CAR PROVIDING A SLIDING DOOR

[75] Inventors: Fumihiko Ogawa, Hamamatsu; Kazunobu Hori, Kosai; Keiichi Asai; Tomoyoshi Watanabe, both of Hamamatsu, all of Japan

[73] Assignee: Suzuki Motor Company Limited, Kamimura, Japan

[21] Appl. No.: 398,840

[22] Filed: Aug. 23, 1989

[30] Foreign Application Priority Data

| Aug. 29, 1988 | [JP] | Japan | 63-214684 |
| Aug. 29, 1988 | [JP] | Japan | 63-214688 |
| Aug. 29, 1988 | [JP] | Japan | 63-214690 |
| Sep. 6, 1988 | [JP] | Japan | 63-222643 |
| Sep. 6, 1988 | [JP] | Japan | 63-222647 |
| Sep. 6, 1988 | [JP] | Japan | 63-222648 |

[51] Int. Cl.⁵ .............................................. B60J 5/06
[52] U.S. Cl. ........................................... 296/155
[58] Field of Search ............... 296/155; 49/213, 475, 49/483, 485

[56] References Cited

U.S. PATENT DOCUMENTS 3,312,015  4/1967  Plegat .................... 296/155
4,433,507  2/1984  Chikaraishi ............. 296/155
4,544,198 10/1985  Ochiai et al. ........... 296/155
4,869,544  9/1989  Anwyll et al. ........... 296/155

FOREIGN PATENT DOCUMENTS

2250647  6/1975  France ............................ 296/155
540753   1/1977  U.S.S.R. .......................... 296/155
2125887  3/1984  United Kingdom ............. 296/155

Primary Examiner—Robert R. Song
Attorney, Agent, or Firm—McGlew and Tuttle

[57] ABSTRACT

The present invention relates to a car providing a sliding door comprising guide rails mounted along an entry opening formed on the front half section of a car body and a sliding door used as a front door to be slid through a roller assembly to be engaged with each guide rail when it is opened or shut. In this car, the sliding amount of the sliding door is regulated so as to disable the rear end of the sliding door to be projected from the rear end of a car body when it is opened. And, in order to enable the entry opening opening to be fully opened, an auxiliary handle is providced in addition to an outside handle and an inside handle. Further, the invention also relates to improvement of opening or shutting mechanism and structure of the sliding door.

5 Claims, 11 Drawing Sheets

CAR PROVIDING A SLIDING DOOR

FIELD OF THE INVENTION AND RELATED ART STATEMENT

Figure 19:
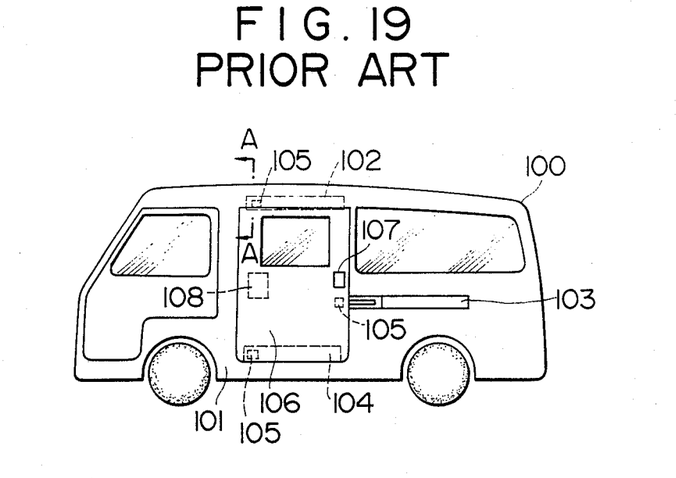
FIGS. 19 to 21 are concept views showing a conventional car providing a sliding door.

A car providing a sliding door, as shown in FIG. 19, comprises horizontal upper, middle, and lower guide rails 102, 103, 104 provided on side sills of an entry opening formed on a side panel 101 of a vehicle body 100 and a guide roller 105 being engaged with these guide rails for mounting a sliding door 106.

For opening or shutting the sliding door 106, an outside handle 107 is provided on a front side of a door panel and an inside locking door handle 108 is provided on a rear side of the door panel. These are employed in a known manner for known purposes (see the Official Gazette of Japanese Patent First Publication No. Showa 57-44523).

Figure 20:
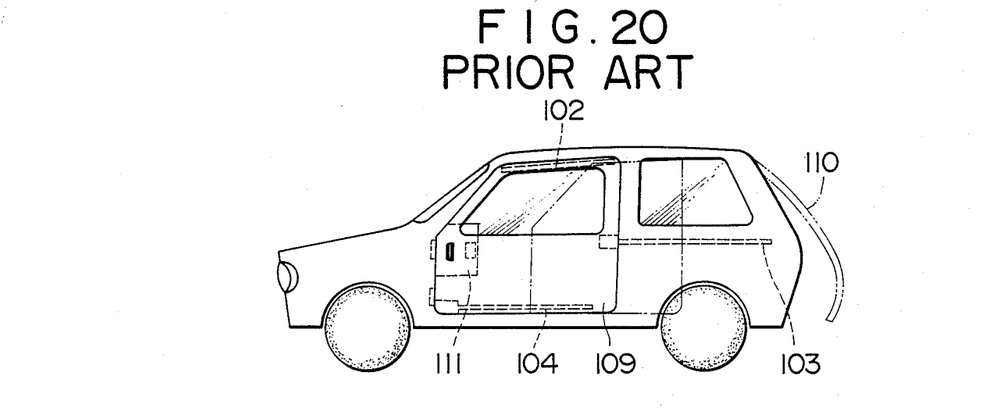

A car as shown in FIG. 20 is known including a curved sliding door 109. the curve is provided because the side panel is curved as viewed from the front side. It is often desirable to provide a sliding door which is mounted onto a car having a back door 110. In such a case, the back door 110 is moved so as to cross the moving direction of the sliding door 109 when the door 110 is opened.

If the sliding door is to provide a large entry opening, when the sliding door 109 is opened it has been necessary to make the sliding door larger. This has the disadvantage that the door extends beyond, a rear end of the vehicle body, so that it may collide with the opened back door. To avoid this disadvantage, a longer stay for supporting the guide roller may be provided so that the sliding door 109 is released from the vehicle body. Yet, conversely, when the sliding door 109 is shut, the stay enters into the inside of the vehicle body too much, thereby the inside space is made narrower.

Figure 21:
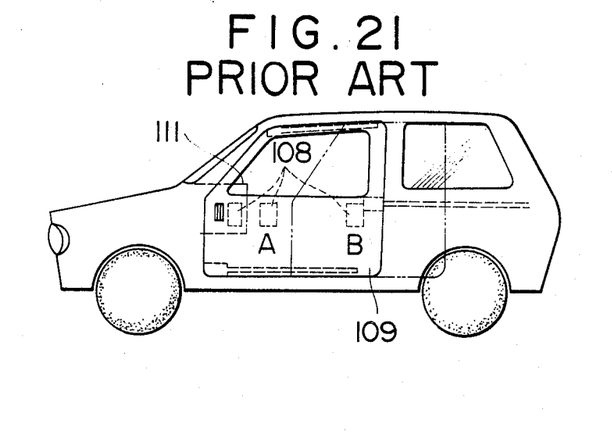

Further, as shown in FIG. 21, when the door locking inside handle 108 serves to shut the sliding door 109, the sliding door 109 is located on the side of an instrument panel 111, so that there is some difficulty in opening or shutting the sliding door 109.

Further, in case the door locking inside handle 108 is mounted to the rear portion A of the instrument panel 111, the sliding door 109 is supposed to have limited opening space, thereby it is difficult to enter and exit the vehicle.

Figure 22:
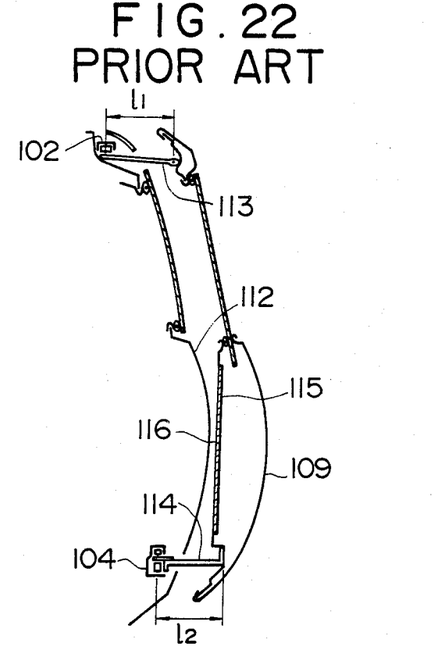
FIG. 22 is a longitudinal section showing a sliding door provided in a passenger car.

On the other hand, assuming that the sliding door is employed for a passenger car, since the passenger car has an outer-curved rear quarter panel 112 for better riding comfort, as shown in FIG. 22, the distance between the side body and the upper and lower portions of the sliding door 109, that is, the lengths $l_1$ and $l_2$ of the arms 113, 114 for supporting the sliding door 109 on the side body, are made so long that the supporting strength of the sliding door 109 becomes inferior, the sliding door 109 becomes thicker, and the front portion of the car chamber including the sliding door 109 offers inferior riding comfort.

In order to solve these shortcomings, it is possible to curve a door inner panel 115 and install a molded door trim 116 onto the curved door inner panel, but the molded door trim 116 is so costly that the car becomes more expensive.

OBJECT AND SUMMARY OF THE INVENTION

It is, therefore, an object of the invention to provide a car including a sliding door which avoids the foregoing shortcomings, and which does not limit the opening amount of the sliding door, and which eliminates interference between the sliding door and the back door.

It is another object of the invention to provide a car including a sliding door which is capable of fully opening the sliding door and easily opening or shutting it.

It is a further object of the invention to provide a car including a sliding door which is designed to avoid interference between a door mirror and the operation of an outside door by designing a positional relation between the door mirror and the outside door.

It is still another object of the invention to provide a car including a sliding door which is capable of offering fully improved riding comfort, advantages with respect to the supporting strength, and which is less expensive to manufacture.

It is yet another object of the invention to provide a car including a sliding door which provides an auxiliary handle on the inner side of the sliding door which is independent of the inside door locking handle and in which the position of the auxiliary handle is on the lower front portion of the sliding door so as to allow the sliding door to be easily opened or shut.

It is a still further object of the invention to provide a car including a sliding door which is designed to provide an outside handle for opening or shutting the door adjacent the lower front side of the front door mirror.

It is a still further object of the invention to provide a car including a sliding door which provides a reinforcing member on the inner wall surface of a rear side of an entry openings corresponding to a bead provided on the outer surface of the side body in the horizontal direction, and which allows the auxiliary handle to stop against the side wall surface providing this reinforcing member, for limiting the opening of the sliding door.

It is a still further object of the invention to provide a car including a sliding door which has a door inner panel curved outwardly like a side body in a manner to mount the door inner panel on the peripheral and central portions of the door trim using a tension type one for curving the door trim.

It is a further object of the invention to provide a car providing a sliding door which provides a lower guide rail on the side section of the side sill and two dust seals at an upper portion of the lower guide rail in a manner to allow the dust seals to cap a gap between the sliding door and the side sill.

BRIEF DESCRIPTION OF THE DRAWINGS

FIGS. 1 and 3 illustrate one embodiment of an automotive vehicle providing a sliding door according to the invention, in which

FIGs. 17 and 18 illustrates sealing structure between the sliding door and the car body, in which

DETAILED DESCRIPTION OF PREFERRED EMBODIMENTS

With reference to FIGS. 1 to 5, denotes a main body of a car providing a sliding door 2. The car main body 1 has an entry opening 4 for mounting a side panel 3 to a sliding door 2. The sliding door 2 is similar to a normal door provided in a normal passenger car. That is, an upper side length l of the sliding door 2 is longer than an lower side length m and the front portion of the upper side is sloped. 1a denotes a hatch-back type back door.

An upper edge 4a and a lower edge 4c of the opening 4 respectively provide an upper guide rail $5_1$ and a lower guide rail $5_3$. And, a middle guide rail $5_2$ is also provided in the similar direction to these upper and lower guide rails $5_1$ and $5_3$.

The upper guide rail $5_1$ is formed to have the same surface as the upper edge 4a along the interval from the upper edge $4_a$ of the opening 4 to a rear panel section 3b. The upper guide rail $5_1$ further extends along the panel section 3b. The length of the upper guide rail $5_1$ is set identical to the length of the lower guide rail $5_3$.

6 denotes a quarter trim element provided outside the upper guide rail $5_1$ and formed to be connected with a roof panel 7. The quarter garnish 6 provides at its lower edge a step portion 9 for forming a given gap between a quarter glass 8 and the quarter trim element 6 itself. It also provides at its rear surface a mount flange 6a and an engaging pawl 6b.

The quarter trim element 6 is mounted on the car body by fixing the mount flange 6a on a mounting panel mounted on the panel section 3b with a screw 11 and then engaging an engaging portion 12 provided on the top of the mounting panel 10 with the engaging pawl 6b.

On the other hand, the sliding door 2 provides guide rollers $13_1$, $13_2$, $13_3$ to be engaged with the upper, middle, and lower guide rails $5_1$, $5_2$, $5_3$ through respective supporting arms 14. The upper guide roller $13_1$ is supported by the upper supporting arm 14 mounted at the upper corner of the sliding door 2.

Figure 1:
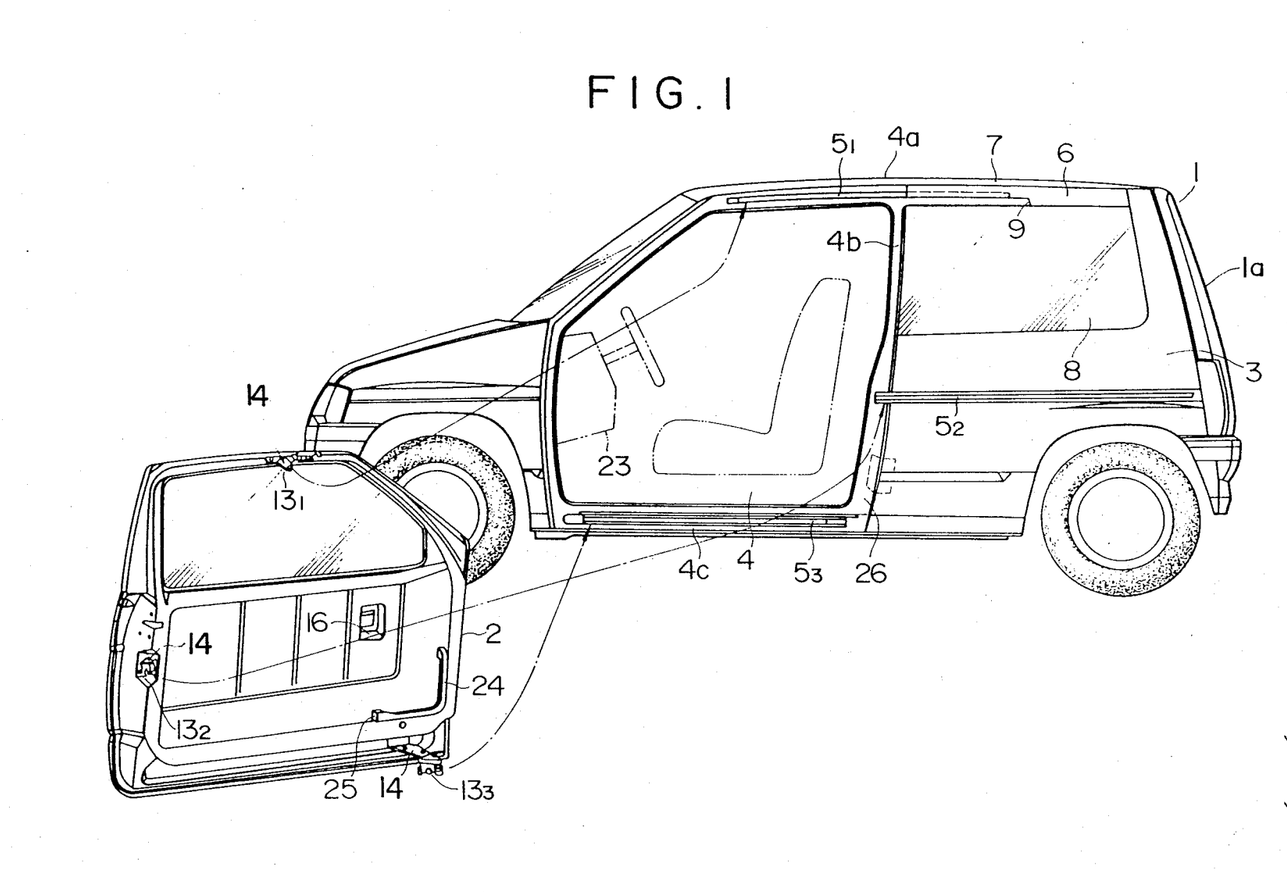
FIG. 1 is a concept view showing a car from which a sliding door is removed.
Figure 2:
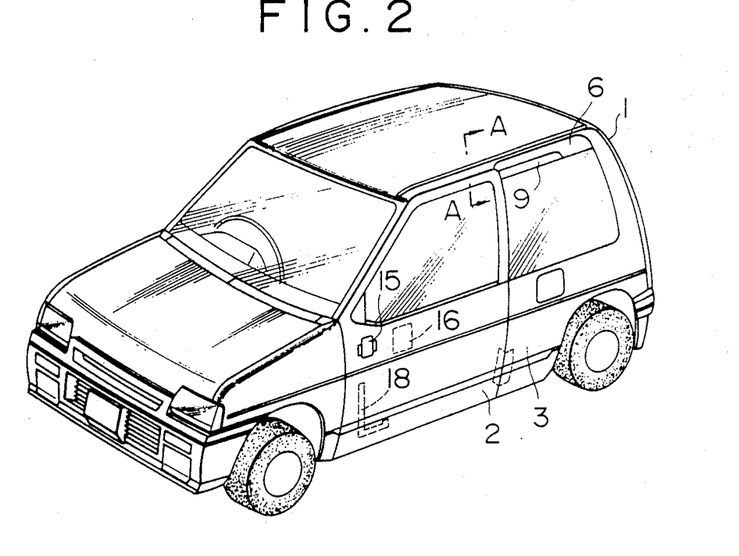
FIG. 2 is a perspective view showing the car having a sliding door shut thereon.
Figure 3:
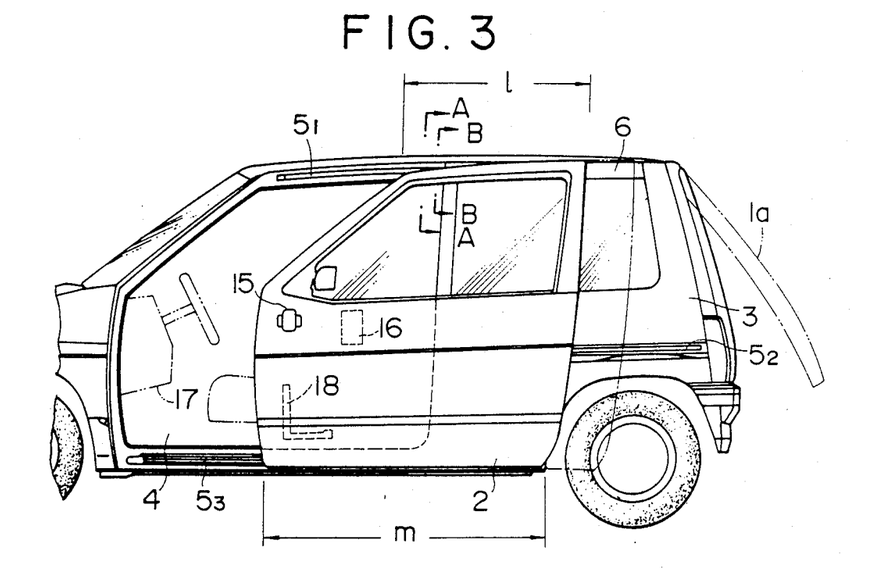
FIG. 3 is a concept view showing the process in which the sliding door is opened.
Figure 4:
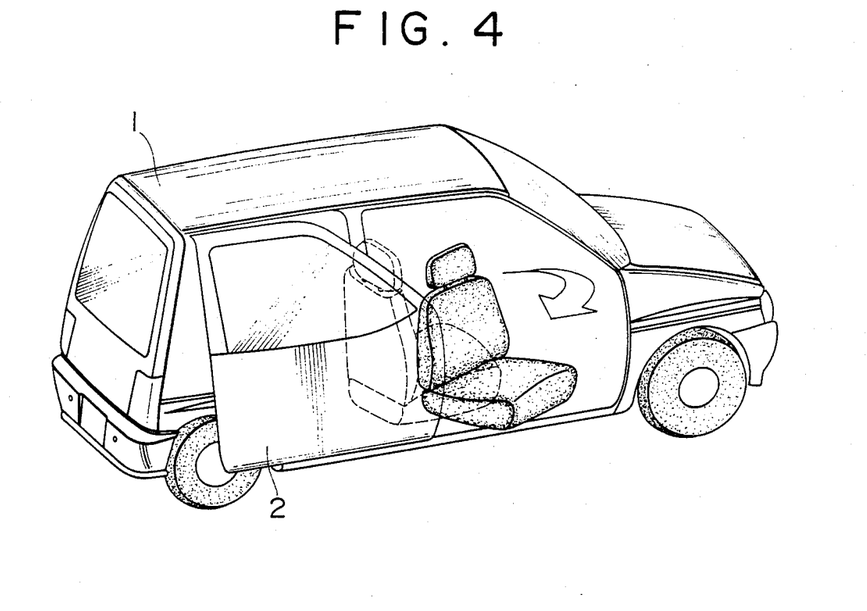
FIG. 4 is a perspective view showing the car from which the sliding door is opened.
Figure 5:
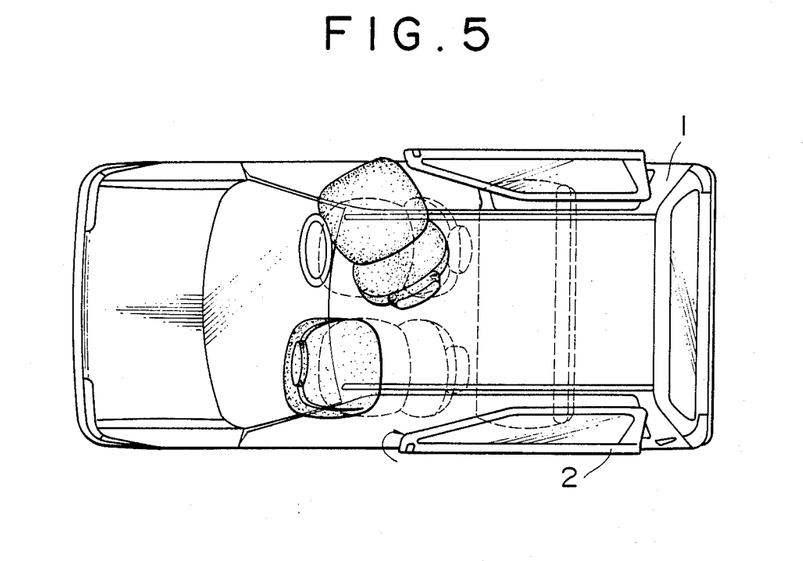
FIG. 5 is a plane view showing the car from which the sliding door is opened.
Figure 6:
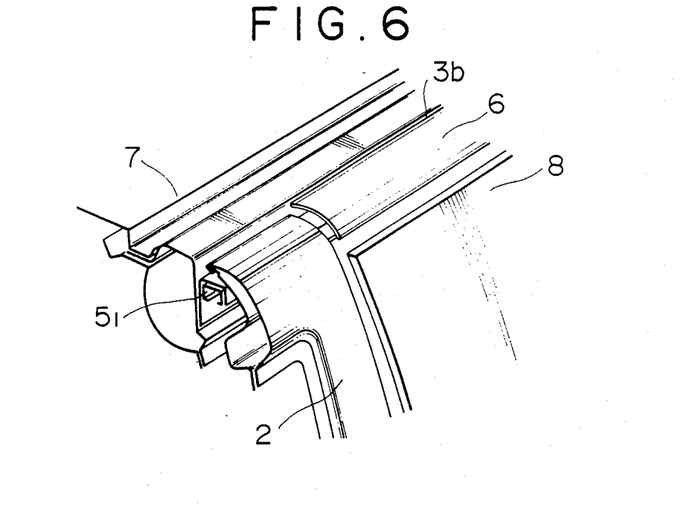
FIG. 6 is a perspective sectional view taken on line A—A of FIG. 2.
Figure 7:
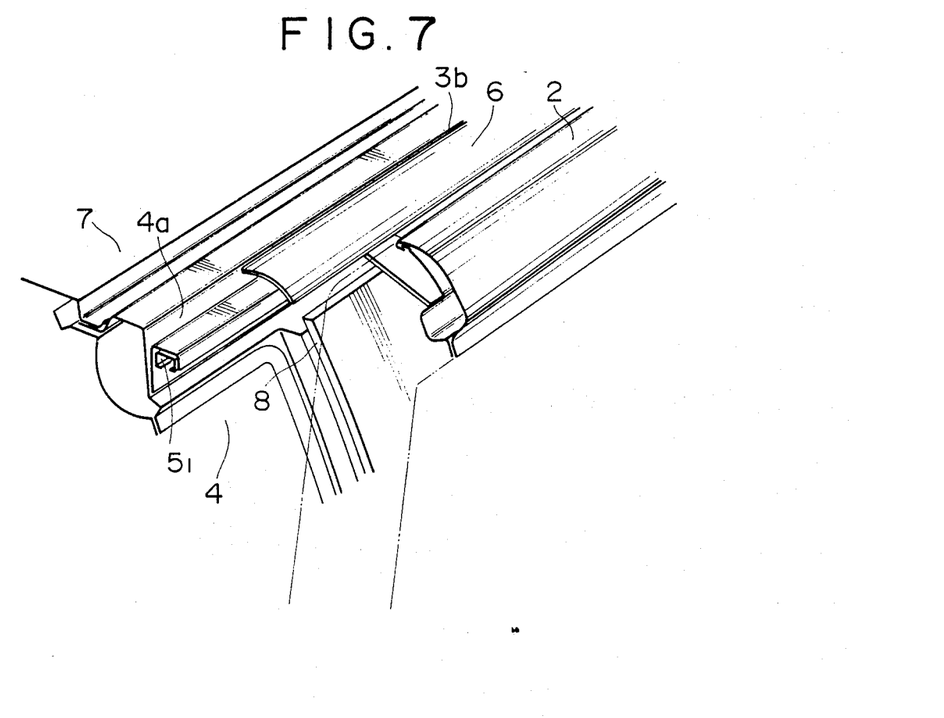
FIG. 7 is a perspective sectional view taken on line A—A of FIG. 3.
Figure 8:
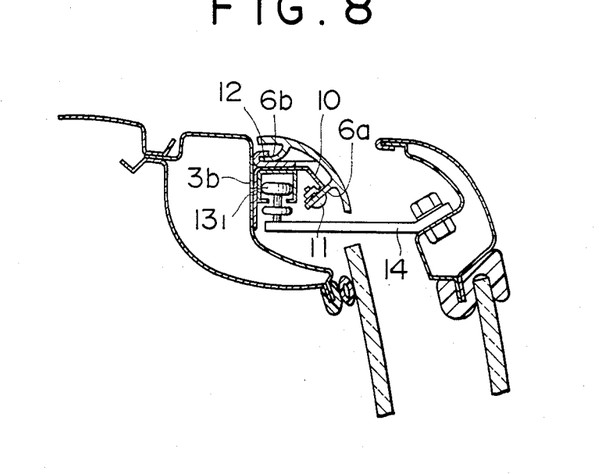
FIG. 8 is a section view taken on B—B of FIG. 3.
Figure 9:
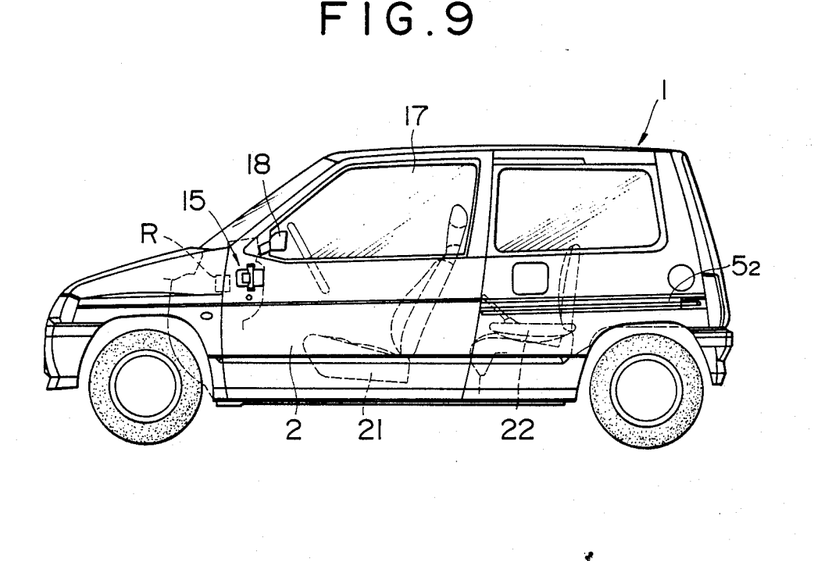
FIG. 9 is a side view showing an opening or shutting mechanism provided external to the sliding door.

The sliding door 2 is designed to be locked by a door locking mechanism R when it is shut as shown in FIG. 9.

The sliding door 2 is opened or closed with an outside handle 15 provided at the outer surface and a door locking inside handle 16 provided at the rear surface.

The sliding door 2 includes a door mirror 18 mounted at the front portion corresponding to the lower edge of the side glass 17 in a manner to allow the door mirror 18 to be projected outwardly. And, an outside handle 15 for opening or shutting the sliding door is located on the outer panel side at the front and lower portion of the door mirror 18.

Figure 10:
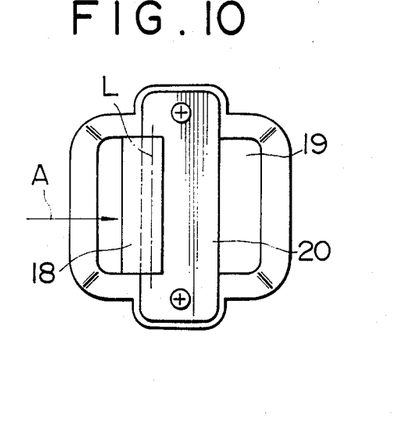
FIG. 10 is an expanded plane view showing an outside handle for opening or shutting the sliding door shown in FIG. 9.

As shown in FIG. 10, a concave box portion 19 is provided on an outer panel of the sliding door 2. A vertically-extending handle member 20 is screwed on the box portion 19 in an erecting manner. The handle member 20 is located at the front and lower portion of the door mirror 18. And, the foregoing outside handle 15 is located in a manner to correspond to the handle member 20. With a hinge mechanism (not shown), the outside handle 15 is forced to be constantly rotated toward the box portion 19 on the center shown by a dashed line. The outside handle 15 is rotated by inserting a user's hand into the box portion 19 from an arrow A so as to release a door locking mechanism R. Then, by pulling the handle member 20 rearwardly, the sliding door 2 is opened. 21 denotes a front seat and 22 denotes a rear seat.

This door locking inside handle 16 is located to avoid interference with an instrument panel 23. 24 denotes an auxiliary handle provided at the front and lower portion on the rear surface of the sliding door 2. The auxiliary handle 24 is located to be behind the lower portion of the instrument panel 23 when the sliding door 2 is shut.

The auxiliary handle 24 has a lower and rear end extended rearwardly so as to form an L-shaped handle and a stopper 25 formed of an elastic material such as rubber which is mounted on the rear end of the extension.

The stopper 25 is fixed on a side wall surface 26 of the entry and serves to regulate the opening amount of the sliding door 2 so as to prevent the rear end of the sliding door 2 from projecting beyond the rear end of the sliding door 2.

Figures 11, 12:
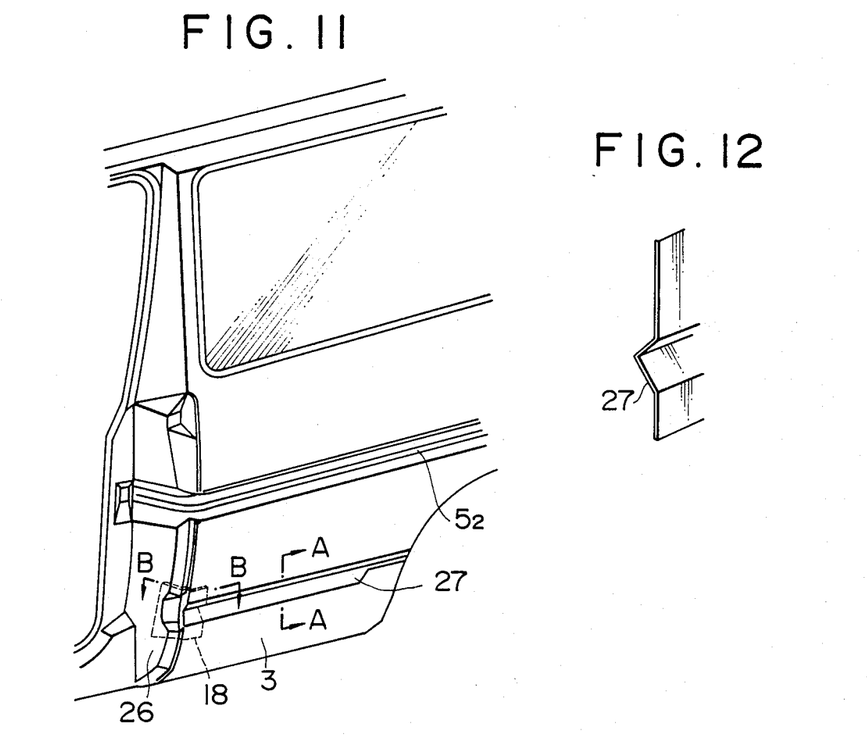
FIG. 11 is a perspective view showing an entry side wall surface on a car side.
FIG. 12 is a sectional view taken on line A—A of FIG. 11.

27 denotes a bead provided on the outer surface of the side panel 3 or the sliding door 2 as shown in FIGS. 11 and 12. The bead 27 is provided from a viewpoint of improving the rigidity of the overall panel and of the design. The bead 27 is provided at a substantially middle position between the guide rails $5_2$ and $5_3$ in a manner to be essentially in parallel with the guide rails $5_2$ and $5_3$.

Figure 13:
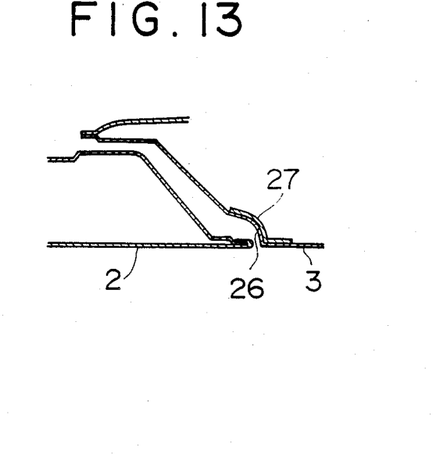
FIG. 13 is a sectional view taken on line B—B of FIG. 11.

The stopper 25 of the auxiliary handle 24 is provided to act against the entry side wall surface 26 on which the bead 27 is provided. The side wall 26 provides on its inner surface a reinforcing plate 28 as shown in FIG. 13 in a manner to protect the side wall surface 26 from being deformed by the stopper 25 when it is contacted thereby.

Figure 14:
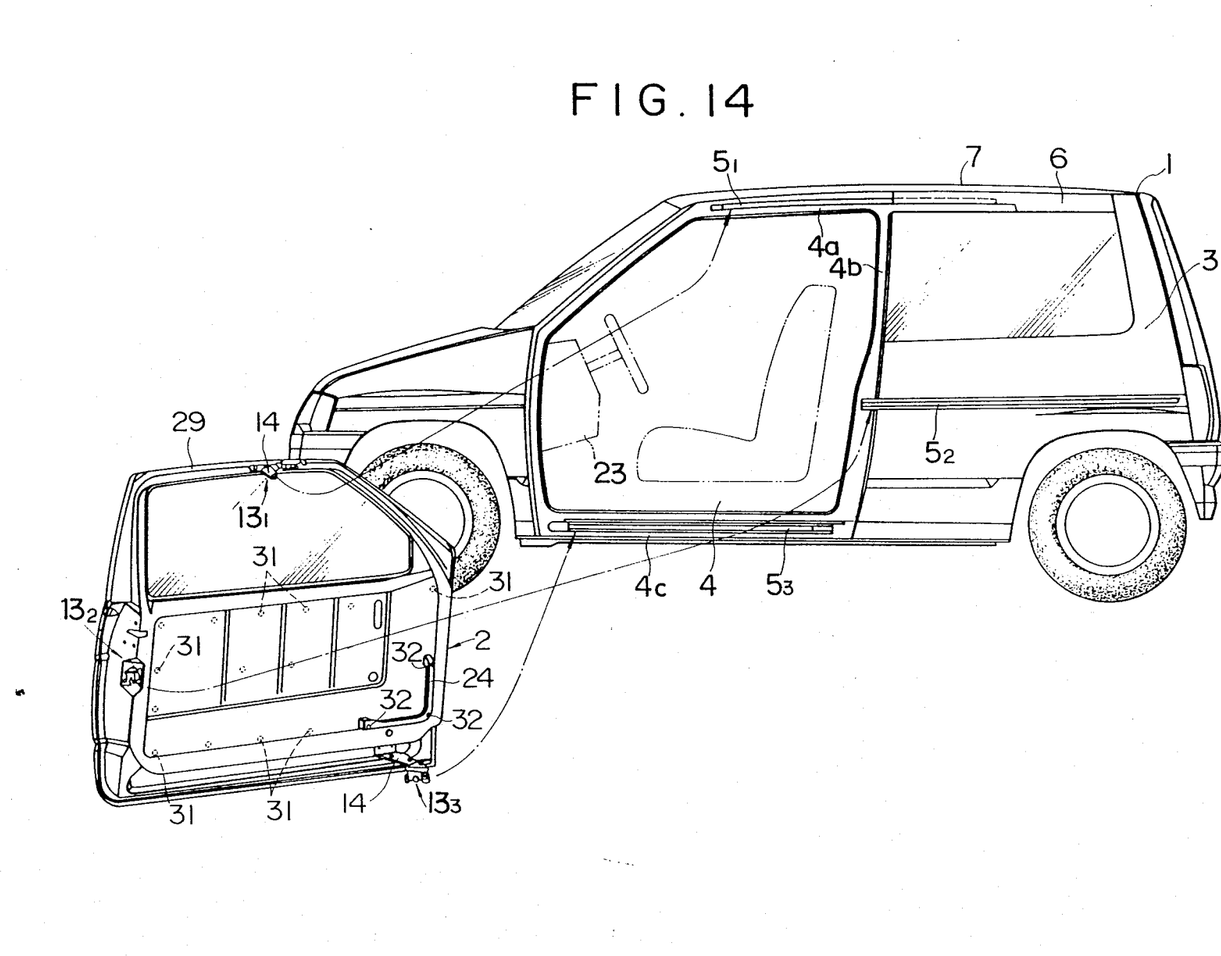
FIG. 14 is a concept view showing structure of a sliding door provided in a car providing a sliding door according to the invention.
Figure 15:
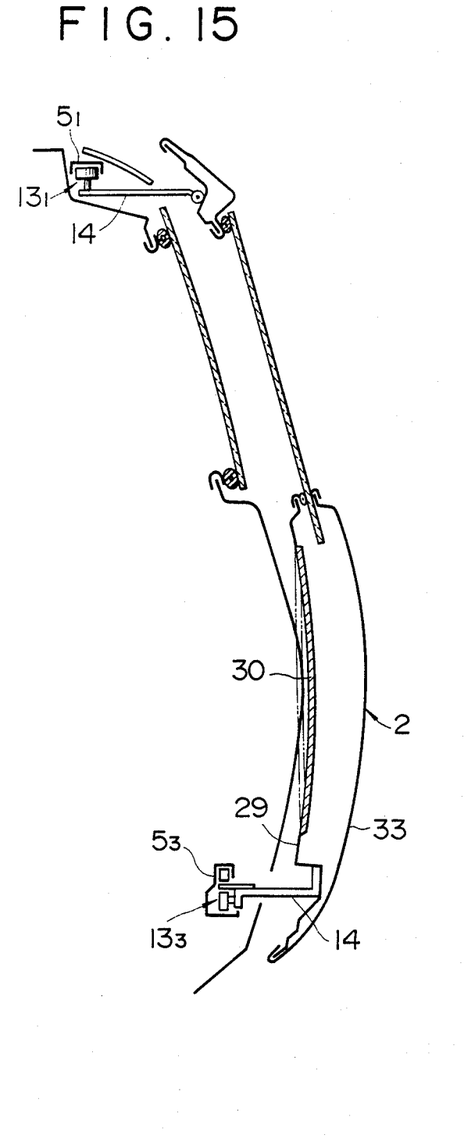
FIG. 15 is a side view conceptually showing the positional relation between the sliding door and a rear quarter panel provided when the sliding door is opened.

Next, a description will be directed to structure of the sliding door with reference to FIGS. 14 and 15.

Figure 16:
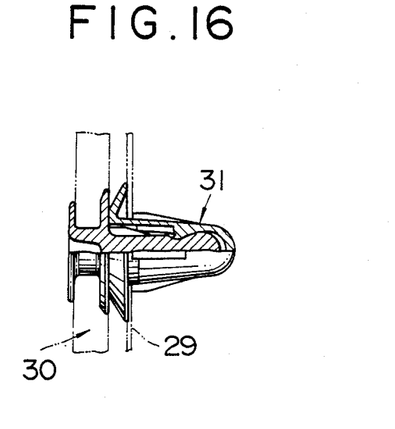
FIG. 16 a partially-broken side view showing a clip used for fixing a door trim on a door inner panel in the sliding door.

The car body 1 has the side panel (rear quarter panel) 3 curved outward of the car, and the sliding door 2 has a door inner panel 29 curved along the side panel 3. The door inner panel 29 has a tension type door trim 30 installed thereon. The peripheral and central portions of the door trim 30 are fixed on the door inner panel 29 by a clip 31 shown in FIG. 16 in a manner to allow the door trim 30 to be formed along the door inner panel 29. In addition, as shown in FIG. 14, the auxiliary handle 24 is fixed on the door inner panel 29 through the door trim 30 by means of a screw 32.

The sliding door 2 is allowed to travel from the opening state shown in FIG. 15 to the front side of the car body along the guide rails $5_1$ and $5_3$ and then convert its traveling direction to the car body side at the front ends of the guide rails $5_1$ and $5_3$ so as to be pressed against the side body. In this state, an outer panel 33 of the sliding door 2 has the same surface as the side panel 3.

Figure 17:
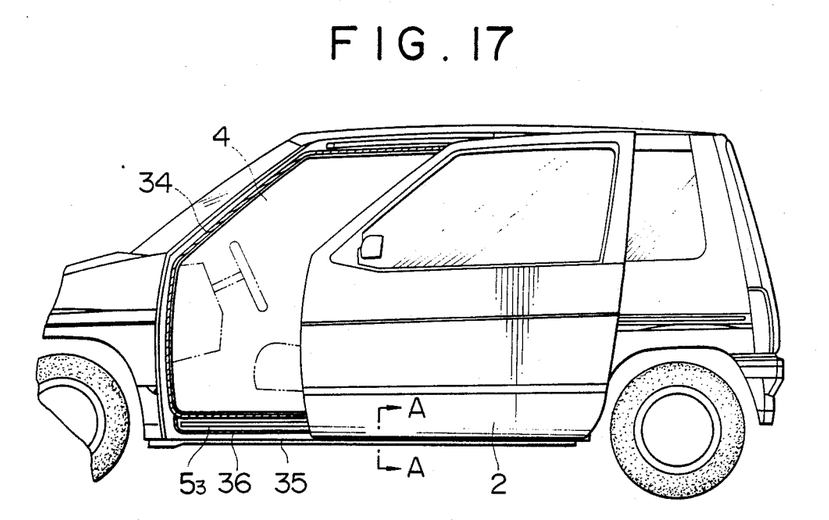
FIG. 17 is a side view of the car body and FIg. 18 is a longitudinal section thereof.

FIG. 17 illustrates the sealing structure between the sliding door 2 and the car body 1.

Figure 18:
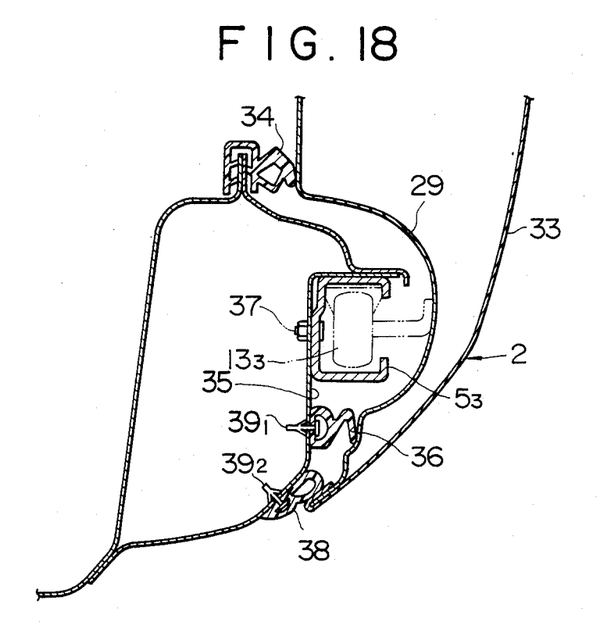

A weatherstrip 34 is provided on the peripheral portion of the opening 4 formed on the car side so as to protect a car chamber from rain or wind. And, a dust seal 36 is provided on a side sill 35 so as to protect the lower guide rail $5_3$ from muddy water or dirt entering into a gap between the sliding door 2 and the side sill 35 from the lower side. FIG. 18 is a longitudinal section showing one example of a mounting structure. 33 denotes a door outer panel and 29 denotes a door inner panel. On the outer side of the side sill 35 is fixed the lower guide rail $5_3$ with a bolt 37. This rail $5_3$ is engaged with a guide roller $13_3$ supported on the door inner panel 29. By this arrangement, the sliding door 2 is allowed to travel to and fro along the lower guide rail $5_3$.

Further, the lower guide rail $5_3$ has at its lower portion a dust seal 36 secured on the side sill with the clip $39_1$.

The other dust seal 38 is fixed on the lower portion of the dust seal 36 with a clip $39_2$. This dust seal 38 serves to cap an entry of a gap formed between the sliding door 2 and the side sill 35.

The car providing a sliding door 2 having the foregoing construction makes it possible to allow a passenger to smoothly sit down on the seats 21, 22 after the sliding door 2 is opened because the outside handle 15 and the handle member 20 are located at the front and lower side of the door mirror 18 to disable the door mirror 3 to interrupt the manual opening or shutting operation.

Next, when the sliding door 2 is opened from the inside, it is opened half way with the door locking inside handle 16 and, after the door locking inside handle 16 passes over the opening 4, it is fully opened with the auxiliary handle 24. At this time, the sliding door 2 operates to open the opening 4 as a result of rotating the guide roller $13_1$, $13_2$, $13_3$ along the upper, middle, and lower guide rails $5_1$, $5_2$, and $5_3$. And, the upper guide roller $13_1$ travels along the upper guide rail $5_1$ into a gap between the quarter trim element 6 and the quarter glass 8, thereby the sliding door 2 is allowed to be fully opened.

On the other hand, when the sliding door 2 is opened, the stopper 25 is fixed on the entry side wall surface 26, thereby the opening distance of the sliding door 2 is regulated. It results in allowing the sliding door 2 to stop at a position where it is prevented from projecting beyond the rear end of the car body 1.

Since the side wall surface 26 is reinforced by the bead 27 and the reinforcing plate 28, sufficient strength can be offered to this sliding door 2.

As set forth above, the car providing a sliding door according to the invention makes it possible to protect the sliding door from hitting the back door even if the sliding door is opened in the state that the hatch back type back door is half opened, because the rear end of the sliding door does not project from the rear end of the car body. And, the invention provides on the inside of the sliding door the auxiliary handle independently of the door locking inside handle, the auxiliary handle being located at the front lower side of the sliding door. Hence, it also makes it possible to open the sliding door fully and easily perform the opening or shutting operation. Further, the reinforcing member is provided on the inside of the rear side wall of the entry corresponding to the bead provided in a horizontal manner to the outside of the side body, and the auxiliary handle is fixed on the side wall surface having the reinforcing member so as to limit the opening amount of the sliding door. Hence, it is possible to reinforce the entry side wall surface to protect it from shock given when the sliding door is opened.

Further, the outside handle, which is used for opening or shutting a sliding door, is located at the front lower side of the door mirror so as to avoid interference of the door mirror against the manual opening or shutting operation and to allow a passenger to get in or get out of the car with a smooth manual sliding operation. The position of the outside handle stays at the front side portion of the sliding door, that is, the portion near the door locking mechanism. Hence, the invention also has an advantage that it is possible to employ some short members such as a locking releasing rod or the like provided between the outside handle and the door locking mechanism.

The sliding door has the door inner panel curved like the rear quarter panel and the door trim curved like the door inner panel. Hence, the sliding door is located close to the car side body, thereby a shorter arm for supporting the sliding door on the side body may be employed providing superior when the sliding door is shut, it is possible to provide a wider space inside of the car and superior riding comfort. In addition, since the deformed tension type door trim is mounted on the door inner panel, the cost is made lower.

The two dust seals serve to screen muddy water and dirt from the lower of the sliding door so that the lower ail is protected from them. Hence, the present invention can improve durability of the lower guide rail to a greater degree than the conventional structure providing one dust seal at the lower portion of the lower guide rail.

In addition, the invention can offer a sufficient sealing effect if these dust seals has low rigidity, so that the sliding door can keep smooth travel at any time.

We claim:

1. A car assembly, comprising a vehicle body defining a front door opening and including a rear panel positioned rearwardly of said front door opening; guiderails mounted adjacent said front door opening; a sliding door positioned to engage said front door opening, said sliding door carrying roller assemblies, each roller assembly engageable with one of said guide rails for opening and shutting said sliding door; and, sliding regulation means for regulating a sliding amount of said sliding door to prevent said sliding door from sliding beyond a rear end of said rear panel, said slide regulating means including an auxiliary handle positioned connected to an inner side of said sliding door, said auxiliary handle being independent of an inside door locking handle.

2. A car according to claim 1, wherein said auxiliary handle includes an elastic material member mounted thereon for engaging a sidewall surface of the car.

3. A car comprising: a car body defining a front door opening, said car body including a rear panel adjacent said front door opening; guiderails mounted adjacent each of said front door openings; a sliding door including roller assemblies engageable with said guiderails; and an auxiliary handle positioned inside said sliding door, said auxiliary handle being independent of an inside door locking handle, said auxiliary handle being positioned at a front lower side of said door.

4. A car according to claim 3, wherein a reinforcing member is provided positioned inside a rear sidewall of said door opening, said reinforcing member corresponding to a bead provided on an outside surface of a side body portion of said front door opening, said reinforcing member extending in a horizontal manner, said auxiliary handle engaging said side wall reinforcing member so as to limit the opening amount of said sliding door.

5. A car according to claim 4, wherein said auxiliary handle includes an elastic material element mounted at a rear end of said auxiliary handle, said elastic material element being pressable against said sidewall surface.

* * * * *